US012540266B2

United States Patent
Masada et al.

(10) Patent No.: US 12,540,266 B2
(45) Date of Patent: Feb. 3, 2026

(54) COMPOSITION AND HEAT TRANSPORT DEVICE

(71) Applicant: CANON KABUSHIKI KAISHA, Tokyo (JP)

(72) Inventors: Yohei Masada, Tokyo (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 536 days.

(21) Appl. No.: 17/728,803

(22) Filed: Apr. 25, 2022

(65) Prior Publication Data

US 2022/0332999 A1 Oct. 20, 2022

Related U.S. Application Data

(63) Continuation of application No. PCT/JP2020/039807, filed on Oct. 23, 2020.

(30) Foreign Application Priority Data

| Oct. 30, 2019 | (JP) | 2019-197995 |
| Oct. 30, 2019 | (JP) | 2019-197996 |
| Oct. 16, 2020 | (JP) | 2020-174682 |
| Oct. 16, 2020 | (JP) | 2020-174683 |

(51) Int. Cl.
*C09K 5/10* (2006.01)
*H01F 1/44* (2006.01)

(52) U.S. Cl.
CPC .............. *C09K 5/10* (2013.01); *H01F 1/44* (2013.01)

(58) Field of Classification Search
None
See application file for complete search history.

(56) References Cited

U.S. PATENT DOCUMENTS

| 4,690,130 A * | 9/1987 | Mirell | A61K 9/5094 |
| | | | 600/4 |
| 5,641,424 A * | 6/1997 | Ziolo | H01F 1/0063 |
| | | | 62/3.1 |
| 7,104,313 B2 * | 9/2006 | Pokharna | H02K 44/04 |
| | | | 257/E23.098 |
| 9,976,814 B2 * | 5/2018 | Gomez | F28F 13/06 |
| 2015/0211407 A1 * | 7/2015 | Hirai | C09K 5/066 |
| | | | 123/1 A |
| 2016/0376486 A1 * | 12/2016 | Atieh | F28F 23/00 |
| | | | 165/104.19 |

FOREIGN PATENT DOCUMENTS

| CN | 1055432 A | 10/1991 |
| CN | 102001711 A | 4/2011 |
| CN | 103426586 A | 12/2013 |

(Continued)

OTHER PUBLICATIONS

CN106318335A English Machine Translation (Year: 2017).*

(Continued)

*Primary Examiner* — Jenna M Maroney
(74) *Attorney, Agent, or Firm* — Canon U.S.A., Inc. IP Division

(57) ABSTRACT

A composition having high dispersibility of a magnetic particle to have storage stability and a heat transport device using the composition. The composition contains a particle and an aqueous medium including water. The particle contains a magnetic particle and a dispersant including polyacrylic acid or a salt thereof.

15 Claims, 4 Drawing Sheets

(56) References Cited

FOREIGN PATENT DOCUMENTS

| | | | |
|---|---|---|---|
| CN | 104024950 A | | 9/2014 |
| CN | 106318335 A | * | 1/2017 |
| CN | 107452457 A | | 12/2017 |
| CN | 107974240 A | | 5/2018 |
| DE | 3709852 A1 | | 10/1988 |
| JP | H03102804 A | | 4/1991 |
| JP | H05140492 A | | 6/1993 |
| JP | H0738328 A | | 2/1995 |
| JP | H07150085 A | | 6/1995 |
| JP | H08224457 A | | 9/1996 |
| JP | 2006286890 A | | 10/2006 |
| JP | 2008177526 A | * | 7/2008 |
| JP | 2009132994 A | | 6/2009 |
| JP | 2012044130 A | | 3/2012 |
| JP | 2014511324 A | | 5/2014 |
| JP | 2014134335 A | | 7/2014 |
| JP | 2018041807 A | | 3/2018 |
| JP | 2021070817 A | * | 5/2021 |
| WO | WO-2012033975 A1 | * | 3/2012 ............... C09K 5/10 |
| WO | 2016014394 A2 | | 1/2016 |

OTHER PUBLICATIONS

JP2008177526A English Machine Translation (Year: 2008).*
Tian Minbo, Magnetic Material, New Materials and Their Applications in High Technoloy Series, Tsinghua University Press, No. 158, Apr. 2001.

* cited by examiner

COMPOSITION AND HEAT TRANSPORT DEVICE

CROSS-REFERENCE TO RELATED APPLICATIONS

This application is a Continuation of International Patent Application No. PCT/JP2020/039807, filed Oct. 23, 2020, which claims the benefit of Japanese Patent Application No. 2019-197995, filed Oct. 30, 2019, Japanese Patent Application No. 2019-197996, filed October 30, 2019, Japanese Patent Application No. 2020-174682, filed Oct. 16, 2020, and Japanese Patent Application No. 2020-174683, filed Oct. 16, 2020, all of which are hereby incorporated by reference herein in their entirety.

TECHNICAL FIELD

The present invention relates to a composition and a heat transport device.

BACKGROUND ART

In cooling of electronic equipment, heat transport devices, such as a heat pipe, have been used. In general, the heat pipe is a heat transport device that transports heat using the phase change of a medium caused by heating a part of a pipe including the medium. However, since the heat generation density (value obtained by dividing the amount of heat generation by surface area) increases with miniaturization in electronic equipment, if a known heat transport device is used, a decrease in processing speed of the electronic equipment and failure due to heat generation occur. Accordingly, a heat transport device that is small according to the size of electronic equipment and (high efficiently) transports a large amount of heat is demanded.

PTL 1 describes a magnetic fluid-driving apparatus including a circulation channel enclosing magnetic fluid, a heating unit in the circulation channel, and a magnetic field applying unit that applies a magnetic field to the magnetic fluid in the heating unit. Specifically, magnetic fluid including a ferrite particle, which is a magnetic microparticle having a property of reducing the magnetization with an increase in temperature, and kerosene or hexane, which is an oil-based medium, is used, and the magnetic fluid is driven by using the difference in magnetization between a heating portion and a non-heating portion in a circulation channel.

PTL 2 describes magnetic fluid prepared by coating the surface of a ferrite particle with oleic acid and sodium dodecylbenzenesulfonate as a surfactant and then dispersing the particle in water. PTL 3 describes temperature sensitive magnetic fluid containing a ferrite particle with 3-mercaptopropionic acid attached to the surface and an aqueous dispersion medium.

As a result of studies by the present inventors, it was revealed that even if the magnetic fluid described in PTL 2 or 3 is applied to the magnetic fluid-driving apparatus described in PTL 1, the magnetic fluid cannot have storage stability due to a reduction in dispersibility of the ferrite particle included in the magnetic fluid, resulting in a decrease in the amount of heat transport.

CITATION LIST

Patent Literature

PTL 1: Japanese Patent Laid-Open No. 2014-134335
PTL 2: Japanese Patent Publication No. 7-38328
PTL 3: Japanese Patent Laid-Open No. 2018-41807

SUMMARY OF INVENTION

Accordingly, it is an object of the present invention to provide a composition having high dispersibility of a magnetic particle to have storage stability. Another object of the present invention is to provide a heat transport device using the composition.

The present invention relates to a composition containing a particle and an aqueous medium including water, wherein the particle contains a magnetic particle and a dispersant including polyacrylic acid or a salt thereof.

The present invention relates to a heat transport device including a channel in which a composition flows, a magnetic field applying unit that applies a magnetic field to the composition, and a heating unit that heats a part of the composition, wherein the composition contains a particle and an aqueous medium including water, and the particle contains a magnetic particle and a dispersant including polyacrylic acid or a salt thereof.

Further features of the present invention will become apparent from the following description of exemplary embodiments with reference to the attached drawings.

DESCRIPTION OF EMBODIMENTS

Figure 1:
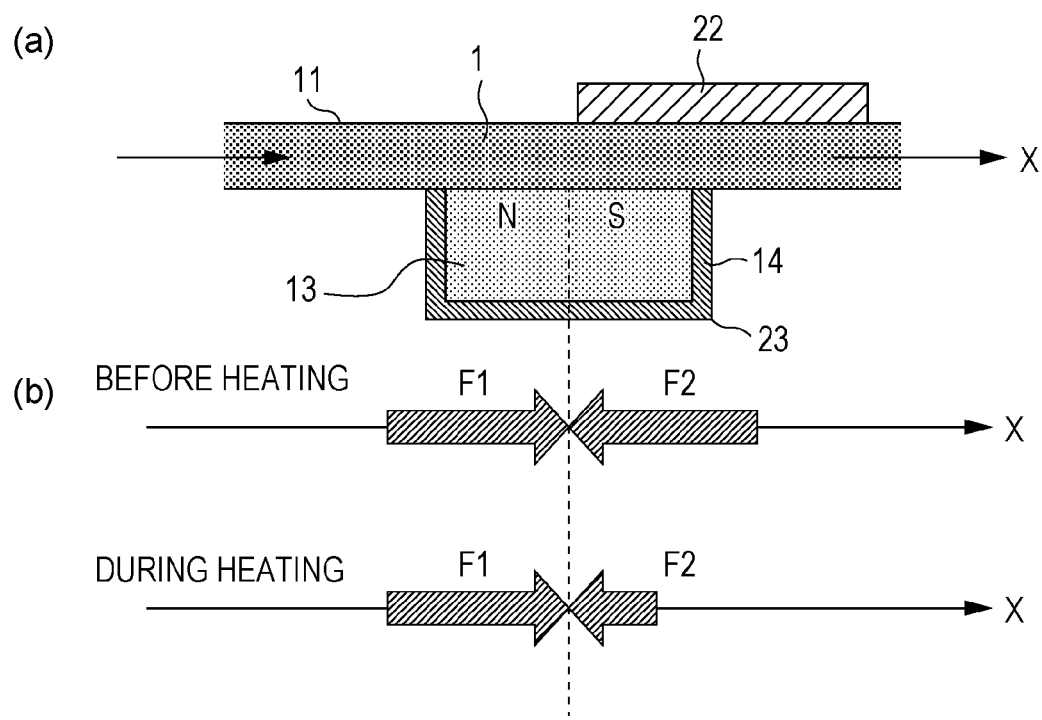
FIG. 1 is a diagram describing the principle of heat transport by the composition of the present invention.

Embodiments of the present invention will now be described in detail. Various physical properties are values at a temperature of 25° C. unless otherwise noted.

The composition of the present invention contains a particle including a magnetic particle and an aqueous medium. When heat transport is performed using a composition containing a magnetic particle, in order to increase the amount of heat transport, it is necessary to increase the flow rate of the composition. Here, in order to increase the flow rate of a composition, it is important to reduce the viscosity of the composition to reduce the flow resistance of the composition. An aqueous medium has a low viscosity compared to the oil-based medium used in the magnetic fluid described in PTL 1. Accordingly, the viscosity of the composition itself can be reduced by using an aqueous medium as the medium dispersing a magnetic particle. In addition, in order to increase the amount of heat transport, it is necessary to use a medium having high thermal capacity and high thermal conductivity. In general, since the thermal capacity and thermal conductivity of an aqueous medium are high compared to those of an oil-based medium, the amount of heat transport of the composition can be increased by using an aqueous medium as the medium for dispersing a magnetic particle.

Furthermore, the particle contains a dispersant including polyacrylic acid or a salt thereof, in addition to the magnetic particle, and the magnetic particle is dispersed by the dispersant including polyacrylic acid or a salt thereof. The use of polyacrylic acid or a salt thereof as the dispersant can stably disperse the magnetic particle by electrostatic repulsion due to the carboxyl group possessed by them and steric hindrance due to the use of the resin, resulting in an improvement in the storage stability of the composition.

When the magnetic fluid described in PTL 2 is used, sodium dodecylbenzenesulfonate contributing to dispersion of a magnetic particle adheres to the magnetic particle by physical adsorption through oleic acid and is likely to detach. Accordingly, the dispersibility of the magnetic particle is reduced, and storage stability of the magnetic fluid is not obtained. 3-Mercaptopropionic acid used in PTL 3 as a dispersant of a magnetic particle has a short molecular chain and is low in compatibility with water. Accordingly, the dispersibility of the magnetic particle is reduced, and storage stability of the magnetic fluid is not obtained.

Each component will now be described in detail.

Composition

The composition of the present invention contains a particle and an aqueous medium including water, and the particle contains a magnetic particle and a dispersant including polyacrylic acid or a salt thereof.

Magnetic Particle

As the magnetic particle, a particle showing superparamagnetism can be used. Here, the superparamagnetism is a property that appears in a ferromagnetic particle of a nanometer size having a property of reducing the magnetization at temperature exceeding the Curie temperature inherent in the magnetic material, that is, a property of decreasing the magnetization with an increase in temperature.

In a particle showing superparamagnetism, the magnetization of the particle is aligned in the magnetic field by application of a magnetic field, and the magnetization when no magnetic field is applied randomly rotates by heat energy without being fixed in the particle, and the magnetization becomes zero for the entire particle. Accordingly, in the use of a composition including a particle showing superparamagnetism as a magnetic particle, when a magnet is brought closer to the composition, that is, when a magnetic field is applied to the composition, the magnetized particle is attracted to the magnet. On the other hand, when a magnet is kept away from the composition, that is, when a magnetic field is not applied to the composition, magnetization is unlikely to occur in the particle, and the particle is unlikely to be attracted to the magnet. Thus, a composition including a particle showing superparamagnetism can be controlled by a magnetic force.

Examples of the particle showing superparamagnetism include ferrite particles. Here, ferrite is a salt of an $M^{II}O \cdot Fe_2O_3$ type divalent metal. Examples of $M^{II}$ include Mn, Fe, Co, Ni, Cu, Zn, Mg, Cd, and Ca. As the ferrite particle, it is preferable to use a magnetite ($FeO \cdot Fe_2O_3$) particle, a manganese zinc ferrite (($MnO)_x \cdot (ZnO)_{1-x} \cdot Fe_2O_3$)) particle, or a manganese calcium zinc ferrite (($MnO)_x \cdot (ZnO)_z \cdot Fe_2O_3$) particle. Here, $x+y+z=1$.

Above all, from the viewpoint of magnitude of magnetization, manganese zinc ferrite is preferably used as the ferrite particle. In particular, manganese zinc ferrite particles represented by the following formula (1) largely decrease the magnetization with an increase in temperature within a temperature range of 0° C. or more and 100° C. or less and show high temperature dependence (temperature sensitivity). Consequently, a high driving force for transporting heat is obtained, and heat can be efficiently transported. $(MnO)_x \cdot (ZnO)_y \cdot (Fe_2O_3)_z$ Formula (1), here, in the formula (1), x, y, and z satisfy $0.15 \leq x \leq 0.40$, $0.10 \leq y \leq 0.25$, $0.48 \leq z \leq 0.60$, and $x+y+z=1$.

One obtained by further adding at least one compound selected from the group consisting of SrO, NiO, MgO, and CaO to the above formula (1) at a ratio of 0.01 or more and 0.10 or less may be used. The addition of these compounds improves the magnetization, obtains a driving force for transporting heat, and can more efficiently perform heat transport. In addition, the magnetic particle preferably includes at least two or more elements selected from the group consisting of Zn, Mn, Fe, Ni, Sr, Mg, and Ca. Furthermore, the magnetic particle preferably includes at least two or more elements selected from the group consisting of Zn, Mn, and Fe.

The content of the magnetic particle based on the total mass of the composition is preferably 20.0 parts by mass or more and 50.0 parts by mass or less and further preferably 30.0 parts by mass or more and 50.0 parts by mass or less.

Dispersant

The dispersant for dispersing the magnetic particle includes polyacrylic acid or a salt thereof. The dispersant adheres to the magnetic particle, coats the particle surface, and can stably disperse the magnetic particle in the aqueous medium. Here, the dispersant coating the particle surface does not necessarily have to coat the entire particle and may partially coat the particle, and the coating dispersant layer does not have to be uniform.

Examples of the salt of polyacrylic acid include a alkali metal salt, an ammonium salt, and an organic ammonium salt of polyacrylic acid. Examples of the alkali metal include lithium, sodium, and potassium. Examples of the organic ammonium include alkylamines having 1 or more and 3 or less carbon atoms, such as methylamine and ethylamine. In particular, the polyacrylic acid is preferably an alkali metal salt, such as sodium and potassium, or an organic ammonium salt.

The amount of polyacrylic acid or a salt thereof used is preferably 5 marts by mass or more and 100 parts by mass or less, further preferably 10 parts by mass or more and 50 parts by mass or less, relative to 100 parts by mass of the magnetic particle. If the amount of the dispersant is low relative to the magnetic particle, the magnetic particle is unlikely to be stably dispersed, and the storage stability is not sufficiently obtained in some cases. In contrast, if the amount of the dispersant is high relative to the magnetic particle, the viscosity of the composition is increased to increase the flow resistance of the composition. Consequently, the flow rate of the composition is lowered, and the amount of heat transport of the composition decreases in some cases.

The weight average molecular weight of the polyacrylic acid or a salt thereof is preferably 3000 or more and 20000 or less. When the weight average molecular weight is less than 3000, the magnetic particle is unlikely to be stably dispersed, and the storage stability is not sufficiently obtained in some cases. When the weight average molecular weight exceeds 20000, the viscosity of the composition is increased to increase the flow resistance of the composition. Consequently, the flow rate of the composition is lowered, and the amount of heat transport of the composition decreases in some cases. Furthermore, the weight average molecular weight of the polyacrylic acid or a salt thereof is preferably 4500 or more and 7000 or less. Here, the weight average molecular weight is a polystyrene equivalent weight average molecular weight determined by gel permeation chromatography.

The content of the dispersant based on the total mass of the composition is preferably 1.0 parts by mass or more and 20.0 parts by mass or less and further preferably 1.0 parts by mass or more and 8.0 parts by mass or less.

Volume-based 50% cumulative particle diameter (D50) of particle

The volume-based 50% cumulative particle diameter (D50) of the particle is preferably 200 nm or less. Here, the particle sedimentation velocity increases proportionally to the square of the particle diameter according to the Stokes equation. Accordingly, when the D50 exceeds 200 nm, the particle sedimentation velocity increases to reduce the dispersibility of the particle, and the storage stability of the composition is therefore not sufficiently obtained in some cases. The D50 is preferably 10 nm or more. When the D50 is less than 10 nm, the magnetic particle has a large relative surface area and is likely to be oxidized in the aqueous medium.

Volume-based 90% cumulative particle diameter (D90) of particle

The volume-based 90% cumulative particle diameter (D90) of the particle is preferably 500 nm or less. When the D90 exceeds 500 nm, the dispersibility of the magnetic particle is reduced, and the storage stability of the composition is not sufficiently obtained in some cases.

The D50 and the D90 are dispersion particle diameters of a magnetic particle dispersed by a dispersant and can be measured by a dynamic light scattering method (DLS method).

Aqueous Medium

The aqueous medium includes water. The aqueous medium preferably further includes a water-soluble organic solvent. From the viewpoint of the viscosity of the composition, the content of the water-soluble organic solvent is preferably 10 parts by mass or more and 100 parts by mass or less relative to 100 parts by mass of water. Examples of the water-soluble organic solvent include polyhydric alcohols, such as glycol, more specifically, ethylene glycol, diethylene glycol, propylene glycol, dipropylene glycol, and glycerol. The content of the aqueous medium based on the total mass of the composition is preferably 30.0 parts by mass or more and 80.0 parts by mass or less. When the content of water is less than 30 parts by mass, the viscosity of the composition is increased to lower the flow rate of the composition, and as a result, the amount of heat transport is also decreased in some cases. When the content of water in the composition exceeds 80 parts by mass, the amount of the magnetic particle included in the composition is decreased, and the driving force for transporting heat is therefore not sufficiently obtained in some cases.

Other Component

The composition of the present invention may contain other components other than the above-mentioned components as needed. Examples of other components include various additives, such as a pH adjuster, a surfactant, an anti-rust agent, a preservative, a fungicide, an antioxidant, a reduction inhibitor, an evaporation accelerator, and a chelating agent.

The pH adjuster adjusts the pH of the composition. The pH of the composition is preferably 7 or more and 14 or less, more preferably 8 or more and 13 or less, and further preferably 8 or more and 12 or less. When the pH of the composition is within the above-mentioned range, the carboxyl group of polyacrylic acid or a salt thereof as the dispersant for the magnetic particle is ionized to be likely to have affinity with water, and the magnetic particle can be stably dispersed in an aqueous medium. Examples of the pH adjuster include hydroxides of alkali metals, such as sodium hydroxide, potassium hydroxide, and calcium hydroxide; hydroxides of alkaline earth metals; and amine compounds, such as triethylamine.

The content of the surfactant is preferably 0.1 parts by mass or more and 10 parts by mass or less relative to 100 parts by mass of the magnetic particle. When the composition contains a surfactant, the magnetic particle can be further stably dispersed.

Method for Manufacturing Composition

An example of a method for manufacturing the composition will be described, but the invention is not limited to the following manufacturing method. The method for manufacturing the composition preferably includes a step of producing a magnetic particle and a step of dispersing the magnetic particle.

Step of Producing Magnetic Particle

The magnetic particle can be produced by a liquid-phase method. Specifically, a metal salt aqueous solution of a metal constituting the magnetic particle is neutralized by addition of an alkaline aqueous solution to form a coprecipitate, and the coprecipitate is heated and reacted to obtain a suspension solution. In order to produce a magnetic particle, the initial salt concentration is important. A metal salt aqueous solution and an alkaline aqueous solution are mixed to start a reaction for forming particles. On this occasion, since a high salt concentration continuously causes particle formation to cause agglomeration, it is preferable that the salt concentration when the magnetic particle is produced is low.

The suspension solution after the conclusion of the reaction is washed with deionized water. Examples of the washing method include decantation, centrifugation, and ultrafiltration. Washing is carried out until the salt concentration in the suspension solution reaches 100 ppm or less. After washing, centrifugation, heating, or vacuum drying is performed to obtain a high-concentration magnetic particle paste.

Step of Dispersing Magnetic Particle

An aqueous solution containing polyacrylic acid or a salt thereof as a dispersant for a magnetic particle is added to the obtained magnetic particle paste to allow the dispersant to directly adhere to the magnetic particle surface. As a result, the magnetic particle can be dispersed in water. A part of the carboxyl groups is chemically adsorbed to the magnetic particle, and other carboxyl groups are ionized. Accordingly, the magnetic particle has a function of dispersing in water and is stably dispersed in an aqueous medium. The magnetic particle and the carboxyl group are chemically adsorbed to each other, and the carboxyl group is unlikely to detach from the magnetic particle. It is therefore inferred that thickening can be prevented. In addition, since the concentration of the magnetic particle in the composition can be increased, the driving force for transporting heat is improved.

Examples of the disperser to be used for dispersing the magnetic particle include a two-roll mill, a three-roll mill, a ball mill, a pebble mill, a Henschel mixer, a bead mill, a Cobol mill, a Tron mill, a sand mill, a sand grinder, a Sqegvari attritor, a high-speed impeller disperser, a high-speed stone mill, a high-speed impact mill, a disper, a high-speed mixer, a nanomizer, a homogenizer, and an ultrasonic disperser. Although the dispersion conditions are not particularly limited and vary depending on the actual apparatus used, the conditions may be appropriately set so as to form a uniform dispersion solution according to the throughput, such as the type and concentration of the magnetic particle as the object to be treated and the type and concentration of the dispersant. In addition, the excess dispersant may be removed by washing after dispersion.

Viscosity of Composition

As described above, the viscosity of the composition affects the flow resistance when the composition flows in a channel, and as a result, the flow rate of the composition is reduced to decrease the amount of heat transport. Accordingly, the viscosity of the composition of the present invention is preferably low. Specifically, the viscosity of the composition at 25° C. is preferably 1.5 mPa·s or more and 30 mPa·s or less. The viscosity of the composition at 25° C. is more preferably 20 mPa·s or less and further preferably 10 mPa·s or less. Here, the viscosity of a composition can be measured with a rotational viscometer.

Heat Transport Device

FIG. 1 is a diagram describing the principle of heat transport by the composition of the present invention. The principle of the heat transport by the composition of the present invention will now be described in detail. The heat transport device includes a channel 11 in which a composition 1 flows, a magnetic field applying unit 23 that applies a magnetic field to the composition 1, and a heating unit 22 that heats a part of the heats composition 1 (see (a) of FIG. 1). Here, in FIG. 1, the direction in which a composition flows in the channel is indicated by an arrow X.

In (a) of FIG. 1, when a magnetic field H is applied to the composition 1 by the magnetic field applying unit 23, the composition 1 acts as fluid having magnetization M. Here, the magnetization M and a magnetic volume force F (M·∇H) proportional to the magnetic field gradient ∇H act on the composition to which the magnetic field H is applied. Before heating, magnetic volume forces F1 and F2 acting on the composition are balanced with each other with the center of the magnetic field applying unit 23 (broken line portion) as the boundary, and the composition does not flow (see (b) of FIG. 1). However, during heating, the magnetic volume force F2 acting on the composition on the right side with the center of the magnetic field applying unit 23 as the boundary, that is, on the composition heated by the heating unit 22 is lowered by a reduction in the magnetization M of the magnetic particle by heating. Consequently, during heating, the magnetic volume force F1 is larger than the magnetic volume force F2, and the composition flows in the X direction.

Figure 2:
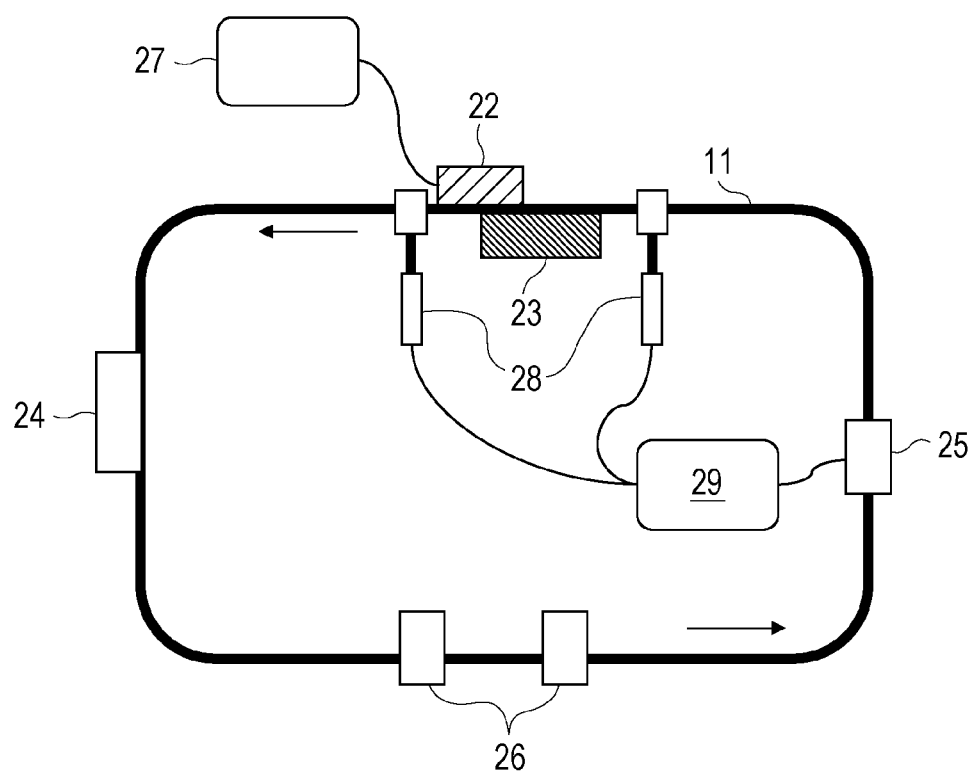
FIG. 2 is a schematic diagram illustrating an example of the heat transport device of the present invention.

FIG. 2 is a schematic diagram illustrating an example of the heat transport device of the present invention. The heat transport device includes a channel 11 in which a composition 1 flows, a magnetic field applying unit 23 that applies a magnetic field to the composition 1, and a heating unit 22 that heats a part of the composition 1. The heat transport device preferably further includes a cooling unit 24, a flowmeter 25, and a temperature sensor 28. As the temperature sensor 28, a thermocouple composed of two different metal conductors is preferably used. The heating unit 22 is preferably connected to a current and voltage source 27, and the flowmeter 25 and the temperature sensor 28 are preferably connected to a display 29. Furthermore, the channel 11 is preferably connected by a connector 26.

As the channel 11, for example, a copper tube, an aluminum tube, a Teflon (registered trademark) tube, a silicon tube, or a rubber tube is used. The material of the channel is preferably changed depending on the position in the device. In the portion where heat is input and output, such as the heating unit 22 and the cooling unit 24, input and output of heat can be efficiently performed by using a channel having excellent heat conductivity, such as a copper tube or an aluminum tube. In other portions, a Teflon tube, which can be piped freely and can lower the flow resistance to increase the flow rate, is preferably used.

Figure 3:
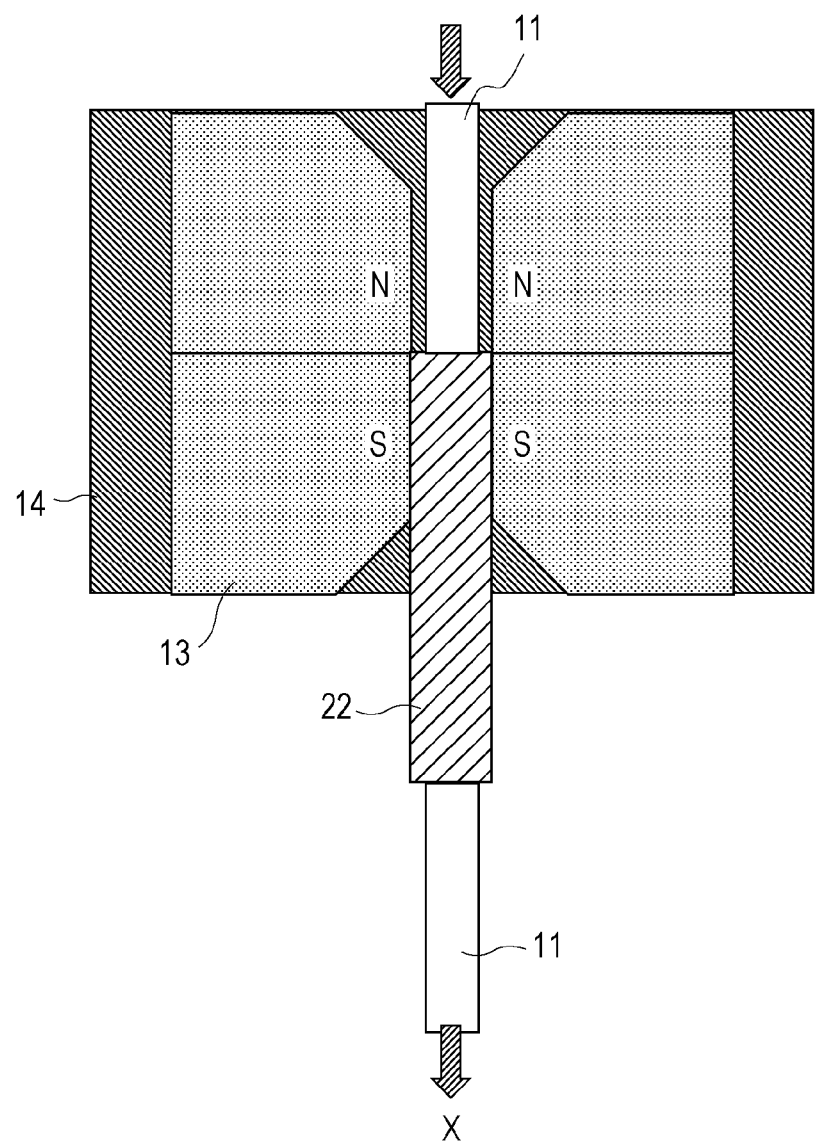
FIG. 3 is a schematic diagram illustrating a magnetic field applying unit of the heat transport device of FIG. 2 in detail.

FIG. 3 is a schematic diagram illustrating a magnetic field applying unit of the heat transport device of FIG. 2 in detail. Here, in the magnetic field applying unit 23, magnets 13 are disposed so as to face each other with the channel 11 therebetween. The magnetic field applying unit 23 is disposed such that the maximum point of magnetic field strength becomes one. Examples of the magnets 13 to be used in the magnetic field applying unit include permanent magnets and electromagnets. In particular, as shown in FIG. 3, when the magnetic field applying unit 23 includes a permanent magnet magnetic circuit including the magnets 13 and a yoke 14 as an iron core for coupling between two magnets of the N pole and the S pole with a magnetic flux, the heat transport device can perform heat transport by heating only without using an external power supply. In FIG. 3, a part of the channel 11 is constituted so as to be a heating unit 22.

The heating unit 22 gives a temperature gradient to the composition 1 in the channel 11. Examples of the heating means of the heating unit include an electric heater, an air heater, and a lamp heater. A part of the heating unit 22 preferably faces the magnetic field applying unit 23 through the channel 11.

Figure 4:
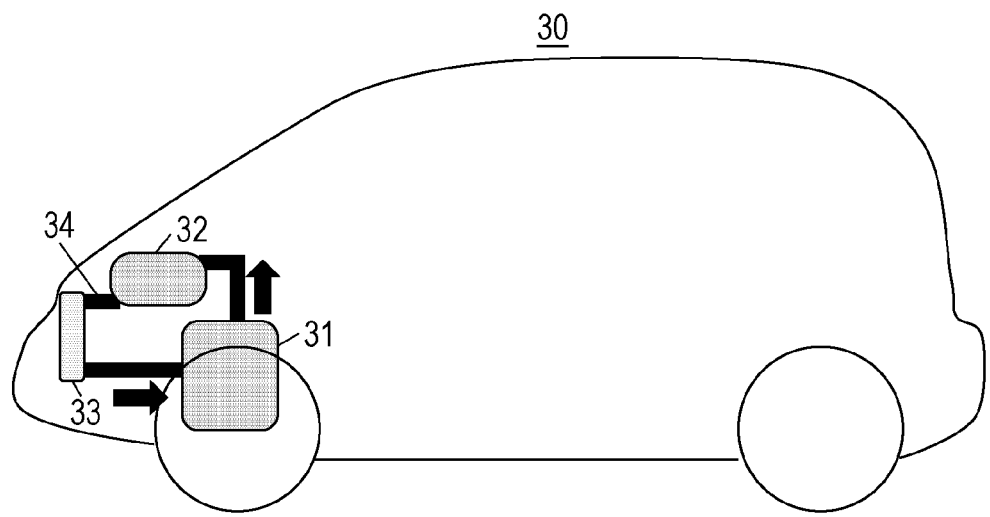
FIG. 4 is a diagram illustrating an example of transport equipment incorporated with the heat transport device of FIG. 2.

FIG. 4 is a diagram illustrating an example of transport equipment incorporated with the heat transport device of FIG. 2 in the cooling system for an electric vehicle. Examples of the transport equipment include a vehicle, a ship, an elevator, and a belt conveyer. Hereinafter, a vehicle provided with wheels as a driving mechanism will be described as an example, but the transport equipment is not limited thereto and may be provided with various driving mechanisms.

The cooling system for an electric vehicle to be loaded on an electric motor car 30 as transport equipment is composed of a driving motor 31, a magnetic fluid 1 as a refrigerant, a reservoir 32 for temporarily storing the magnetic fluid 1, a cooler 33 for cooling the magnetic fluid 1, and a channel 34 connecting them. The electromagnet in the driving motor 31 provided in the skeleton (frame) and functioning as a heating unit (heat source) generates heat by driving the motor. The heating unit provided to the skeleton includes not only that directly provided to the exterior of the vehicle but also that installed through a member in the interior space covered by the exterior.

The magnetic fluid 1 lowers the magnetism by receiving this heat, and a flow is caused by the magnetic force of the electromagnet in the motor.

The magnetic fluid 1 received heat from the driving motor 31 passes through the cooler 33 via the reservoir 32 to remove the heat and circulates again as a refrigerant for the driving motor 31.

Figure 5:
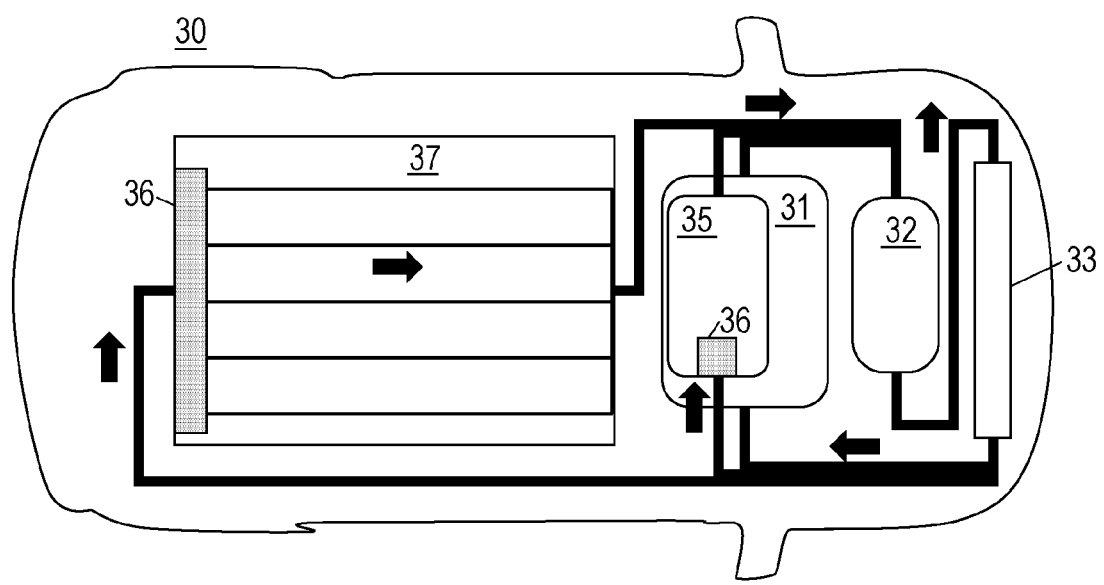
FIG. 5 is a diagram illustrating an example of a parallel configuration of the heat transport device of the present invention.

Furthermore, in an electric vehicle, it may be necessary to cool the inverters such as an IGBT and the battery. Since they generate heat by driving, cooling is necessary for maintaining appropriate temperatures. However, since their appropriate temperatures are different from each other, it may not be preferable to simply arrange them in series. The heat transport device using magnetic fluid can be arranged in parallel, as shown in FIG. 5. FIG. 5 shows a system in which the magnetic fluid 1 cooled by the cooler 33 is divided into the channels of the driving motor 31 and the inverter 35 and receives the heat generated in the driving motor 31 and the inverter 35, and the divided flows are joined at the reservoir 32, followed by cooling by the cooler 33 and circulating again. A magnet 36 is disposed near the heat generation portion of the inverter unit for driving the magnetic fluid. Furthermore, the battery 37 can also be divided for cooling. Also in the battery unit, a magnet 36 is disposed near the heat generation portion. The flow rates can be adjusted to be optimum for the driving motor 31, the inverter 35, and the battery 37 by adjusting the strength of the magnets 36 disposed near the heat generation portions of the inverter 35 and the battery 37 and the flow resistance of the channel.

As another aspect of the present invention, a heat transport mechanism including a channel 11 in which a composition 1 flows and a magnetic field applying unit 23 that applies a magnetic field to the composition 1 may be constituted. Furthermore, a cooling unit 24, a flowmeter 25, and a temperature sensor 28 may be included. That is, the heat transport mechanism is a mechanism assuming that the heat transport mechanism does not include a heating unit (heat source) itself and that the heating unit (heat source) is included in the equipment on which the heat transport equipment is loaded.

Conversely, the above-described heat transport device may be constituted by further disposing a heating unit (heat source) in the heat transport mechanism. In an example of the above-described transport equipment, the transport equipment includes a heat transport mechanism, a heating unit (heat source) such as a driving motor, a skeleton, and a driving mechanism such as wheels.

Since the heat transport device using magnetic fluid does not require electric power and has a small number of parts, it is suitable for a cooling system for an electric vehicle. In addition, the cooling system can also be applied to the case of including both an internal combustion engine and a motor, such as a hybrid vehicle.

Other application examples of the heat transport device and the heat transport mechanism include an internal combustion engines of an automobile or the like, a photovoltaic power generation panel, a large display, a large speaker, a semiconductor typified by a CPU and a GPU, and electric boards using them. That is, it is applicable to various kinds of equipment including heating units (heat sources). Equipment in which a portion of which the temperature is increased by radiant heat or heat propagation from another heat source becomes a heating unit (heat source) of the equipment, such as a solar panel, is also included in the present invention.

EXAMPLES

The present invention will now be described in more detail with reference to Examples and Comparative Examples, but is not limited to the following Examples as long as the gist of the present invention is not exceeded. "Parts" regarding the amount of a component refers to "parts by mass".

Preparation of Compositions 1 to 12

Sodium hydroxide was dissolved in water as shown in Tables 1 and 2 to prepare alkaline aqueous solutions. Metal salts shown in Tables 1 and 2 were dissolved in water to prepare the respective metal salt aqueous solutions.

Subsequently, each metal salt aqueous solution was dropwise added at a rate of 2 mL/min to the sodium hydroxide aqueous solution while stirring for reaction to produce ferrite particles. The pH of the obtained ferrite particles was adjusted to 11 to 12 with a sodium hydroxide aqueous solution. Then, maturing at a temperature of 90° C. or more was performed for 1 hour to obtain a suspension solution of the ferrite particles. The pH of the obtained suspension solution of the ferrite particles was adjusted to 7, and washing with water through magnetic sedimentation was repeated. On this occasion, washing with water was performed until white turbidness did not occur by addition of a barium chloride aqueous solution or a silver chloride aqueous solution to the washing solution. The particles after washing with water were concentrated by centrifugation to obtain each magnetic particle paste.

Sodium polyacrylate as a dispersant shown in Table 1 or 2 and water were added to the obtained magnetic particle paste, followed by dispersion treatment with a homogenized for 6 hours. The concentration of the magnetic particles was then adjusted to obtain each composition. In Tables 1 and 2, the amount of the sodium polyacrylate is the solid content.

The sodium polyacrylate 1 was T-50 (manufactured by Toagosei Co., Ltd.) having a solid content of 40 mass %, and the weight average molecular weight thereof was 6000. The sodium polyacrylate 2 was produced by a general method, and the weight average molecular weight thereof was 5500. The sodium polyacrylate 3 was A-210 (manufactured by Toagosei Co., Ltd.) having a solid content of 40 mass %, and the weight average molecular weight thereof was 3000. The sodium polyacrylate 4 was AC-10P-1 (manufactured by Toagosei Co., Ltd.) having a solid content of a 40 mass %, and the weight average molecular weight thereof was 9000. The sodium polyacrylate 5 was produced by a general method, and the weight average molecular weight thereof was 20000.

Method for Measuring Weight Average Molecular Weight

The weight average molecular weight of a dispersant was measured by gel permeation chromatography (GPC) as follows. A resin was dissolved in tetrahydrofuran (THF) at 25° C. over 24 hours. The resulting solution was filtered through a membrane filter to obtain a sample solution. The sample solution was adjusted such that the concentration of a component soluble in THF was about 0.3%. The weight average molecular weight of the dispersant was measured using this sample solution in the following conditions.

Apparatus: Waters 2695 Separations Module, manufactured by Waters, RI detector: 2414 detector, manufactured by Waters
Column: 4 series of KF-806M, manufactured by Showa Denko K.K.
Eluent: tetrahydrofuran (THF)
Flow rate: 1.0 mL/min
Oven temperature: 40° C.
Sample injection volume: 100 μL In calculation of the weight average molecular weight of a dispersant, a molecular weight calibration curve formed using a standard polystyrene resin (TSK standard polystyrene F-850, F-450, F-288, F-128, F-80, F-40, F-20, F-10, F-4, F-2, F-1, A-5000, A-2500, A-1000, and A-500, manufactured by TOSOH Corporation) was used.

TABLE 1

Preparation of composition

| | | Composition 1 | Composition 2 | Composition 3 | Composition 4 | Composition 5 | Composition 6 |
|---|---|---|---|---|---|---|---|
| Alkaline aqueous solution (part) | Sodium hydroxide | 44.8 | 44.8 | 44.8 | 44.8 | 44.8 | 44.8 |
| | Water | 800 | 800 | 800 | 800 | 800 | 800 |
| Metal salt aqueous solution (part) | $MnSO_4 \cdot 4H_2O$ | 27.0 | 27.0 | 27.0 | 27.0 | 27.0 | 27.0 |
| | $ZnSO_4 \cdot 7H_2O$ | 14.8 | 14.8 | 14.8 | 14.8 | 14.8 | 20.4 |
| | $FeCl_3 \cdot 6H_2O$ | 62.2 | 62.2 | 62.2 | 62.2 | 62.2 | 62.2 |
| | $Fe_2(NO_3)_3 \cdot 6H_2O$ | | 93.0 | | | | |
| | $SrCl_2$ | | | | | | |
| | $NiSO_4$ | | | | | | |
| | Water | 1000 | 1000 | 1000 | 1000 | 1000 | 1000 |
| Dispersant (part) | Sodium polyacrylate 1 | 3.2 | 3.2 | | | | |
| | Sodium polyacrylate 2 | | | 1.6 | | | |
| | Sodium polyacrylate 3 | | | | 3.2 | | |
| | Sodium polyacrylate 4 | | | | | 3.2 | |
| | Sodium polyacrylate 5 | | | | | | 1.6 |

TABLE 2

Preparation of composition

| | | Composition 7 | Composition 8 | Composition 9 | Composition 10 | Composition 11 | Composition 12 |
|---|---|---|---|---|---|---|---|
| Alkaline aqueous solution (part) | Sodium hydroxide | 44.8 | 44.8 | 44.8 | 44.8 | 44.8 | 44.8 |
| | Water | 800 | 800 | 800 | 800 | 200 | 800 |
| Metal salt aqueous solution (part) | $MnSO_4 \cdot 4H_2O$ | 19.4 | 19.4 | 27.0 | 27.0 | 27.0 | 27.0 |
| | $ZnSO_4 \cdot 7H_2O$ | 20.4 | 20.4 | 14.8 | 14.8 | 14.8 | 14.8 |
| | $FeCl_3 \cdot 6H_2O$ | 62.2 | 62.2 | 62.2 | 62.2 | 62.2 | 62.2 |
| | $Fe_2(NO_3)_3 \cdot 6H_2O$ | | | | | | |
| | $SrCl_2$ | | | | | | |
| | $NiSO_4$ | 1.8 | | | | | |
| | $MnSO_4 \cdot 4H_2O$ | | 1.4 | | | | |
| | Water | 1000 | 1000 | 1000 | 1000 | 250 | 1000 |
| Dispersant (part) | Sodium polyacrylate 1 | 3.2 | 3.2 | 2.4 | 10.4 | 3.2 | 3.2 |
| | Sodium polyacrylate 2 | | | | | | |
| | Sodium polyacrylate 3 | | | | | | |
| | Sodium polyacrylate 4 | | | | | | |
| | Sodium polyacrylate 5 | | | | | | |

Tables 3 to 5 show the constitution of the magnetic particles in each composition, and the content (parts) of the magnetic particles, the content (parts) of the dispersant, the content (parts) of the surfactant, and the content (parts) of water in each composition. The contents are all solid contents. In the lower columns of Tables 3 to 5, the viscosity (mPa·s) as the property of a composition and the volume-based 50% cumulative particle diameter D50 (nm) as the property of particles are shown. In Tables 3 to 5, Acetinol E100 is a nonionic surfactant manufactured by Kawaken Fine Chemicals Co., Ltd.

Method for Measuring Viscosity

The viscosity of a composition is a value measured using a rotational viscometer (RE80 rotational viscometer, manufactured by Toki Sangyo Co., Ltd.) at a temperature of 25° C.

Method for Measuring D50

The D50 of particles is a value measured using a particle size measuring apparatus (Nanotrac 150, manufactured by Microtrac) by a dynamic light scattering method. The measurement conditions were the number of times of measurement: three times and measurement time: 120 seconds.

TABLE 3

Table 3: Constitution of magnetic particle, composition of composition, and property

| | | Composition 1 | Composition 2 | Composition 3 | Composition 4 |
|---|---|---|---|---|---|
| Constitution of magnetic particle | Formula | $MnO_xZnO_y(Fe_2O_3)_z$ | $MnO_xZnO_y(Fe_2O_3)_z$ | $MnO_xZnO_y(Fe_2O_3)_z$ | $MnO_xZnO_y(Fe_2O_3)_z$ |
| | x | 0.29 | 0.29 | 0.29 | 0.29 |
| | y | 0.13 | 0.13 | 0.13 | 0.13 |
| | z | 0.58 | 0.58 | 0.58 | 0.58 |
| | w | | | | |
| Composition (parts) of composition | Magneti particle | 37.0 | 37.0 | 37.0 | 35.0 |
| | Dispersant Acetinol E100 | 4.3 | 4.3 | 4.3 | 4.3 |
| | Water | 58.7 | 58.7 | 58.7 | 60.7 |
| Property | Viscosity of composition (mPa·s) | 5.6 | 5.1 | 5.1 | 12 |
| | $D_{50}$ of particle (nm) | 38 | 28 | 28 | 38 |

TABLE 4

Table 4: Constitution of magnetic particle, composition of composition, and property

| | | Composition 5 | Composition 6 | Composition 7 | Composition 8 |
|---|---|---|---|---|---|
| Constitution of magnetic particle | Formula | $MnO_xZnO_y(Fe_2O_3)_z$ | $MnO_xZnO_y(Fe_2O_3)_z$ | $MnO_xZnO_ySrO_w(Fe_2O_3)_z$ | $MnO_xZnO_yNiO_w(Fe_2O_3)_z$ |
| | x | 0.29 | 0.24 | 0.22 | 0.22 |
| | y | 0.13 | 0.18 | 0.18 | 0.18 |
| | z | 0.58 | 0.58 | 0.58 | 0.58 |
| | w | | | 0.02 | 0.02 |
| Composition (parts) of composition | Magneti particle | 37.0 | 35.0 | 35.0 | 35.0 |
| | Dispersant Acetinol E100 | 4.3 | 4.3 | 4.3 | 4.3 |
| | Water | 58.7 | 60.7 | 60.7 | 60.7 |
| Property | Viscosity of composition (mPa·s) | 8.7 | 30 | 3.6 | 3.4 |
| | $D_{50}$ of particle (nm) | 385 | 400 | 33 | 37 |

TABLE 5

Table 5: Constitution of magnetic particle, composition of composition, and property

| | | Composition 9 | Composition 10 | Composition 11 | Composition 12 |
|---|---|---|---|---|---|
| Constitution of magnetic particle | Formula | $MnO_xZnO_y(Fe_2O_3)_z$ | $MnO_xZnO_y(Fe_2O_3)_z$ | $MnO_xZnO_y(Fe_2O_3)_z$ | $MnO_xZnO_y(Fe_2O_3)_z$ |
| | x | 0.29 | 0.29 | 0.29 | 0.29 |
| | y | 0.13 | 0.13 | 0.13 | 0.13 |
| | z | 0.58 | 0.58 | 0.58 | 0.58 |
| | w | | | | |
| Composition (parts) of composition | Magneti particle | 37.0 | 37.0 | 37.0 | 37.0 |
| | Dispersant Acetinol E100 | 3.0 | 10.0 | 4.3 | 4.3 0.5 |
| | Water | 60.0 | 53.0 | 58.7 | 58.2 |
| Property | Viscosity of composition (mPa·s) | 4.2 | 9.8 | 6.5 | 5.5 |
| | $D_{50}$ of particle (nm) | 45 | 55 | 110 | 36 |

Preparation of Composition 13

A magnetic particle paste was obtained by the same method as for compositions 1 to 12. Water was added to the resulting magnetic particle paste to make 600 g, and the temperature was set to 95° C. to obtain a solution including the magnetic particles. 3-Mercaptopropionic acid (6.8 g) was dissolved in water (150 mL), and the temperature was set to 60° C. to obtain a solution including 3-mercaptopropionic acid.

The solution including 3-mercaptopropionic acid was added the solution including the magnetic particles while stirring for a reaction at 95° C. for 1 hour to allow 3-mercaptopropionic acid to adsorb to the magnetic particles. Subsequently, washing with water through magnetic sedimentation was repeated to remove excess 3-mercaptopropionic acid, and concentration and drying were performed until the solid content of the magnetic particles reached 90 mass % to obtain 33 g of dried magnetic particles.

The dried magnetic particles (32 g) were added to a solution prepared by dissolving a 24% sodium hydroxide aqueous solution (2 g) in water (20 g), followed by stirring at a high speed for 30 minutes to disperse the magnetic particles. Subsequently, magnetic sedimentation was performed for concentration to obtain a composition 13 of which the content of the magnetic particles was 45.0 parts.

Preparation of Composition 14

A magnetic particle paste was obtained by the same method as for compositions 1 to 12. Water was added to the resulting magnetic particle paste to make 500 g, and the temperature was set to 80° C. to obtain a solution including the magnetic particles. Sodium oleate (20 g) was added to the solution including the magnetic particles while stirring at 80° C. for 30 minutes to allow sodium oleate to adsorb to the magnetic particles. Subsequently, the heating was stopped, and the solution was neutralized by addition of hydrochloric acid to adjust the pH to 6.5 to 7 to obtain magnetic particles adsorbed with sodium oleate.

The resulting magnetic particles were repeatedly washed with water through magnetic sedimentation. On this occasion, washing with water was performed until white turbidness did not occur by addition of a barium chloride aqueous solution to the washing solution. Subsequently, dehydration was performed with a centrifugal dehydrator to obtain 42 g of a hydrous magnetic particles in which the solid content of the magnetic particles was 70%.

Water (50 g) and a 50% sodium dodecylbenzenesulfonate aqueous solution (18 g) were uniformly stirred, and the resulting hydrous magnetic particles (20 g) were added thereto to obtain a composition 14 in which the content of the magnetic particles was 20.0 parts.

Preparation of Composition 15

Preparation of a composition was performed by the same method as for composition 14 to obtain a composition 15 in which the content of the magnetic particles was 30.0 parts.

Preparation of Compositions 16 and 17

Preparation of compositions was performed by the same method as for compositions 1 to 12 to obtain a composition 16 in which the content of the magnetic particles was 17.0 parts and a composition 17 in which the content of the magnetic particles was 30.0 parts.

Composition 18

Ferricolloid TS-50K (manufactured by Ichinen Chemicals Co., Ltd.) of which the base medium is kerosene, which is an oil-based medium, was used as the magnetic particles. The viscosity of the composition was 13.1 mPa·s, and the D50 of the particles was 11 nm.

Table 6 shows the alkaline aqueous solution (parts), metal salt aqueous solution (parts), and dispersant (parts) used for preparing compositions. Table 7 shows the constitution of the magnetic particles in each composition and the content (parts) of the magnetic particles, the content (parts) of the dispersant, the content (parts) of the surfactant, and the content (parts) of water in the composition. The contents are all solid contents. In the lower column of Table 7, the viscosity (mPa·s) as the property of a composition and the volume-based 50% cumulative particle diameter D50 (nm) as the property of particles are shown.

TABLE 6

| | | Preparation of composition | | | | |
|---|---|---|---|---|---|---|
| | | Composition 13 | Composition 14 | Composition 15 | Composition 16 | Composition 17 |
| Alkaline aqueous solution (part) | Sodium hydroxide | 44.8 | 44.8 | 44.8 | 44.8 | 44.8 |
| | Water | 800 | 800 | 800 | 800 | 800 |
| Metal salt aqueous solution (part) | $MnSO_4 \cdot 4H_2O$ | 27.0 | 27.0 | 27.0 | 20.4 | 27.0 |
| | $ZnSO_4 \cdot 7H_2O$ | 14.8 | 14.8 | 14.8 | 22.6 | 14.8 |
| | $FeCl_3 \cdot 6H_2O$ | 62.2 | 62.2 | 62.2 | 62.2 | 62.2 |
| | $Fe_2(NO_3)_3 \cdot 6H_2O$ | | | | | |
| | Water | 600 | 600 | 600 | 600 | 600 |
| Dispersant (part) | Sodium polyacrylate 1 | | | | 8.0 | 8.0 |
| | 3-Mercaptopropionic acid | 6.8 | | | | |
| | Sodium oleate | | 20.0 | 20.0 | | |
| | Sodium dodecylbenzenesulfonate | | 9.0 | 9.0 | | |

TABLE 7

Constitution of magnetic particle, composition of composition, and property

|  | Formula | Composition 13 $MnO_xZnO_y(Fe_2O_3)_z$ | Composition 14 $MnO_xZnO_y(Fe_2O_3)_z$ | Composition 15 $MnO_xZnO_y(Fe_2O_3)_z$ | Composition 16 $MnO_xZnO_y(Fe_2O_3)_z$ | Composition 17 $MnO_xZnO_y(Fe_2O_3)_z$ |
|---|---|---|---|---|---|---|
| Constitution of magnetic particle | x | 0.29 | 0.29 | 0.29 | 0.22 | 0.29 |
|  | y | 0.13 | 0.13 | 0.13 | 0.20 | 0.13 |
|  | z | 0.58 | 0.58 | 0.58 | 0.58 | 0.58 |
|  | w |  |  |  |  |  |
| Composition (parts) of composition | Magnetic particle | 45.0 | 20.0 | 30.0 | 17.0 | 30.0 |
|  | Dispersant Acetinol E100 | 13.5 | 15.0 | 20.0 | 1.8 | 3.2 |
|  | Water | 41.5 | 65.0 | 50.0 | 81.2 | 66.8 |
| Property | Viscosity of composition (mPa · s) | 4.8 | 3.9 | 30.5 | 1.4 | 5.2 |
|  | $D_{50}$ of particle (nm) | 1657 | 50 | 48 | 32 | 28 |

Preparation of Compositions 19 to 26

Preparation of compositions was performed by the same method as for compositions 1 to 12 to obtain compositions 19 to 26 in which the content of the magnetic particles was 35.0 parts.

Tables 8 and 9 show the constitution of the magnetic particles in each composition, the content (parts) of the magnetic particles, the content (parts) of the dispersant, the content (parts) of the water-soluble organic solvent, and the content (parts) of water in the composition. In the lower columns of Tables 8 and 9, the F25-F90 (gF) as the property of a composition and the volume-based 50% cumulative particle diameter D50 (nm) as the property of particles are shown.

The compositions exemplified below include glycol or glycerol in 10 parts by mass or more and 50 parts by mass or less relative to 100 parts by mass of the composition.

TABLE 8

Table 8: Constitution of magnetic particle, composition of composition, and property

|  |  | Composition 19 | Composition 20 | Composition 21 | Composition 22 |
|---|---|---|---|---|---|
| Constitution of magnetic particle | Formula | $MnO_xZnO_y(Fe_2O_3)_z$ | $MnO_xZnO_y(Fe_2O_3)_z$ | $MnO_xZnO_y(Fe_2O_3)_z$ | $MnO_xZnO_y(Fe_2O_3)_z$ |
|  | x | 0.35 | 0.35 | 0.35 | 0.35 |
|  | y | 0.14 | 0.14 | 0.14 | 0.14 |
|  | z | 0.51 | 0.51 | 0.51 | 0.51 |
| Composition (parts) of composition | Magnetic particle | 35.0 | 35.0 | 35.0 | 35.0 |
|  | Dispersant | 3.8 | 3.8 | 3.8 | 3.8 |
|  | Ethylene glycol | 10.0 | 30.0 |  |  |
|  | Propylene glycol |  |  | 10.0 | 20.0 |
|  | Glycerol |  |  |  |  |
|  | Water | 51.2 | 31.2 | 51.2 | 4.2 |
| Property | $F_{25}$-$F_{90}$ (g) | 10.8 | 11.5 | 10.9 | 10.8 |
|  | Viscosity of composition (mPa · s) | 4.9 | 9.5 | 5.2 | 7.2 |
|  | $D_{50}$ of magnetic particle (nm) | 32.6 | 37.4 | 32 | 33.9 |

TABLE 9

Table 9: Constitution of magnetic particle, composition of composition, and property

|  |  | Composition 23 | Composition 24 | Composition 25 | Composition 26 |
|---|---|---|---|---|---|
| Constitution of magnetic particle | Formula | $MnO_xZnO_y(Fe_2O_3)_z$ | $MnO_xZnO_y(Fe_2O_4)_z$ | $MnO_xZnO_y(Fe_2O_4)_z$ | $MnO_xZnO_y(Fe_2O_5)_z$ |
|  | x | 0.35 | 0.35 | 0.35 | 0.35 |
|  | y | 0.14 | 0.14 | 0.14 | 0.14 |
|  | z | 0.51 | 0.51 | 0.51 | 0.51 |

TABLE 9-continued

Table 9: Constitution of magnetic particle, composition of composition, and property

|  |  | Composition 23 | Composition 24 | Composition 25 | Composition 26 |
|---|---|---|---|---|---|
| Composition (parts) of composition | Magnetic particle | 35.0 | 35.0 | 35.0 | 35.0 |
|  | Dispersant | 3.8 | 3.8 | 3.8 | 3.8 |
|  | Ethylene glycol |  |  |  | 50.0 |
|  | Propylene glycol |  |  |  |  |
|  | Glycerol | 10.0 | 20.0 |  |  |
|  | Water | 51.2 | 41.2 | 61.2 | 11.2 |
| Property | $F_{25}$-$F_{90}$ (g) | 11.5 | 10.7 | 11.2 | — |
|  | Viscosity of composition (mPa · s) | 10.0 | 12.3 | 3.5 | — |
|  | $D_{50}$ of magnetic particle (nm) | 39.8 | 38.6 | 32.5 | Not dispersed |

Evaluation

In the present invention, A and B are acceptable levels and C is an unacceptable level in the following evaluation criteria. Table 10 shows the evaluation results.

Storage Stability

Each composition (10 mL) obtained above was put in a glass sample tube (capacity: 30 mL, outer diameter: 30 mm, height: 63 mm, base area: 5 cm$^2$) and sealed. After leaving to stand for 3 days, the state of dispersion of magnetic particles was visually verified to evaluate the storage stability.

A: No change in the state was observed,
B: Gelation occurred, but redispersion was possible, and
C: Gelation occurred, and redispersion was not possible.

Flow Rate

A prototype of the heat transport device of FIG. 1 was produced, and a driving test for a composition was performed. The magnetic field applying unit employed, as shown in FIG. 3, the same pole placement of two neodymium magnets of 60×30×30t mm and two magnetic circuits, the neodymium magnets having an easy axis of magnetization in the perpendicular direction of the channel 11 and magnetizing directions opposite to each other, the magnetic circuits being constituted of yoke material SS400 of 70×30 ×10t mm. Here, the magnetic circuits were arranged so as to face each other with the channel 11 therebetween.

A Teflon (registered trademark) tube with an inner diameter of 4 mm was used as the channel 11, a copper tube with an inner diameter of 4 mm and a length of 40.0 mm was used as the heating unit, and the total length of the channel 11 was set to 1200 mm.

The heating unit was formed of, as shown in FIG. 3, a copper tube that can arbitrarily change the relative position with respect to the magnetic circuit and was connected a DC power source. The temperature of the copper tube was measured with a thermocouple as the temperature sensor, and the current and the voltage were adjusted such that the measurement value was 25° C. to 90° C. Each composition was enclosed in the channel to produce a heat transport device.

The temperature of the composition in the channel when not heated was set to 25° C., and the copper tube temperature (the temperature applied to the composition) was changed using the heat transport device to perform a driving test for the composition to measure the flow rate.

TABLE 10

Table 10: Evaluation result

|  | No. of composition | Driving force | Flow rate at 60° C. (mL/min) | Flow rate at 80° C. (mL/min) | Difference in flow rate between 60° C. and 80° C. (mL/min) |
|---|---|---|---|---|---|
| Example 1 | 1 | A | 15.8 | 26.4 | 10.6 |
| Example 2 | 2 | A | 15.5 | 26.2 | 10.7 |
| Example 3 | 3 | A | 21.0 | 27.6 | 6.6 |
| Example 4 | 4 | B | 13.3 | 19.6 | 6.3 |
| Example 5 | 5 | B | 13.2 | 22.7 | 9.5 |
| Example 6 | 6 | B | 12.8 | 22.1 | 9.3 |
| Example 7 | 7 | A | 26.3 | 31.5 | 5.2 |
| Example 8 | 8 | A | 25.9 | 30.9 | 5.0 |
| Example 9 | 9 | A | 14.2 | 19.8 | 5.6 |
| Example 10 | 10 | A | 13.0 | 21.0 | 8.0 |
| Example 11 | 11 | A | 14.5 | 24.6 | 10.1 |
| Example 12 | 12 | A | 15.5 | 26.0 | 10.5 |
| Comparative Example 1 | 13 | C | 12.5 | 14.5 | 2.0 |
| Comparative Example 2 | 14 | C | 0.0 | 0.0 | 0.0 |
| Comparative Example 3 | 15 | C | 0.0 | 0.0 | 0.0 |

TABLE 10-continued

Table 10: Evaluation result

| | No. of composition | Driving force | Flow rate at 60° C. (mL/min) | Flow rate at 80° C. (mL/min) | Difference in flow rate between 60° C. and 80° C. (mL/min) |
|---|---|---|---|---|---|
| Reference Example 1 | 16 | A | 0.0 | 0.0 | 0.0 |
| Reference Example 2 | 17 | A | 0.0 | 0.0 | 0.0 |
| Reference Example 3 | 18 | A | 12.0 | 15.0 | 3.0 |
| Example 13 | 19 | A | 51.0 | 60.6 | 9.6 |
| Example 14 | 20 | A | 25.2 | 34.2 | 9.0 |
| Example 15 | 21 | A | 49.0 | 59.9 | 10.9 |
| Example 16 | 22 | A | 35.6 | 43.8 | 8.2 |
| Example 17 | 23 | A | 17.0 | 24.5 | 7.5 |
| Example 18 | 24 | A | 20.2 | 27.1 | 6.9 |
| Example 19 | 24 | A | 76.1 | 87.0 | 10.9 |
| Comparative Example 6 | 24 | C | — | — | — |

In Comparative Example 1, the storage stability of the composition was the unacceptable level C, and the difference (mL/min) in the flow rate between 60° C. and 80° C. was low compared to Examples. In Comparative Examples 2 and 3, the storage stabilities of the compositions were the unacceptable level C, and the flow rates at 60° C. and 80° C. were both 0.0. This indicates that the driving force for heat transport was decreased by a reduction in the storage stability of each of the compositions of Comparative Examples 1 to 3.

In Reference Examples 1 and 2, although the storage stabilities of the compositions were the acceptable level A, the flow rates at 60° C. and 80° C. were both 0.0. This indicates that the driving force for heat transport was decreased by the low content of the magnetic particles in the compositions.

In Reference Example 3, although the storage stability of the composition was the acceptable level A, the difference (mL/min) in the flow rate between 60° C. and 80° C. was low compared to Examples. This indicates that since the medium in the composition was an oil-based medium, the flow rate decreased, and the amount of heat transport was not large. In Comparative Example 6, since the water content was low, the dispersant did not sufficiently function and could not disperse the magnetic fluid in the medium.

The present invention is not limited to the above embodiments and can be variously changed and modified without departing from the spirit and scope of the present invention. Accordingly, the following claims are attached for making the scope of the present invention public.

According to the present invention, it is possible to provide a composition having high dispersibility of a magnetic particle to have storage stability and a heat transport device using the composition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A composition comprising a particle and an aqueous medium including water, wherein
the particle contains a magnetic particle and a dispersant including polyacrylic acid or a salt thereof; and
the composition decreases magnetization with an increase in temperature within a temperature range of 0° C. to 100° C., and increases magnetizaton with a decrease in temperature within the above temperature range,
wherein the dispersant has a weight average molecular weight of a range of 3000 to 20000,
wherein the magnetic particle is a manganese zinc ferrite particle represented by formula (1):

$$(MnO)_x \cdot (ZnO)_y \cdot (Fe2O3)_z \qquad \text{Formula (1)}$$

in formula (1), x, y, and z satisfy $0.15 \leq x \leq 0.40$, $0.10 \leq y \leq 0.25$, $0.48 \leq z \leq 0.60$, and $x+y+z=1$; and at least one compound selected from the group consisting of SrO, NiO, MgO, and CaO is further added to formula (1) at a ratio of 0.01 to 0.10.

2. The composition according to claim 1, wherein the dispersant has a weight average molecular weight of a range of 4500 to 7000.

3. The composition according to claim 1, wherein the particle has a volume-based 50% cumulative particle diameter of 200 nm or less.

4. The composition according to claim 1, wherein a content of the magnetic particle based on total mass of the composition is within a range of 20.0 parts by mass to 50.0 parts by mass.

5. The composition according to claim 1, wherein a content of the dispersant based on total mass of the composition is within a range of 1.0 parts by mass to 20.0 parts by mass.

6. The composition according to claim 5, wherein a content of the dispersant based on total mass of the composition is within a range of 1.0 parts by mass to 8.0 parts by mass.

7. The composition according to claim 1, wherein a content of the aqueous medium based on total mass of the composition is within a range of 30.0 parts by mass to 80.0 parts by mass.

8. The composition according to claim 1, wherein
the aqueous medium includes a water-soluble organic solvent, and
a content of the water-soluble organic solvent relative to 100 parts by mass of the water is within a range of 10 parts by mass to 100 parts by mass.

9. The composition according to claim 1, wherein the composition has a viscosity within a range of 1.5 mPa·s to 30 mPa·s.

10. The composition according to claim 1, comprising glycol or glycerol in a range of 10 parts by mass to 50 parts by mass relative to 100 parts by mass of the composition.

11. The composition according to claim 10, wherein the glycol is ethylene glycol or propylene glycol.

12. A heat transport mechanism comprising a channel in which a composition flows and a magnetic field applying unit that applies a magnetic field to the composition, wherein the composition is the composition according to claim 1.

13. A heat transport device comprising:
the heat transport mechanism according to claim 12; and
a heat source that heats a part of the composition.

14. Transport equipment comprising:
the heat transport device according to claim 13;
a skeleton; and
a driving mechanism.

15. Equipment comprising the heat transport mechanism according to claim 12.

* * * * *